March 29, 1927. 1,622,277
R. BECKER
SPREADER MECHANISM FOR SEWING MACHINES
Filed Nov. 29, 1924 2 Sheets-Sheet 1
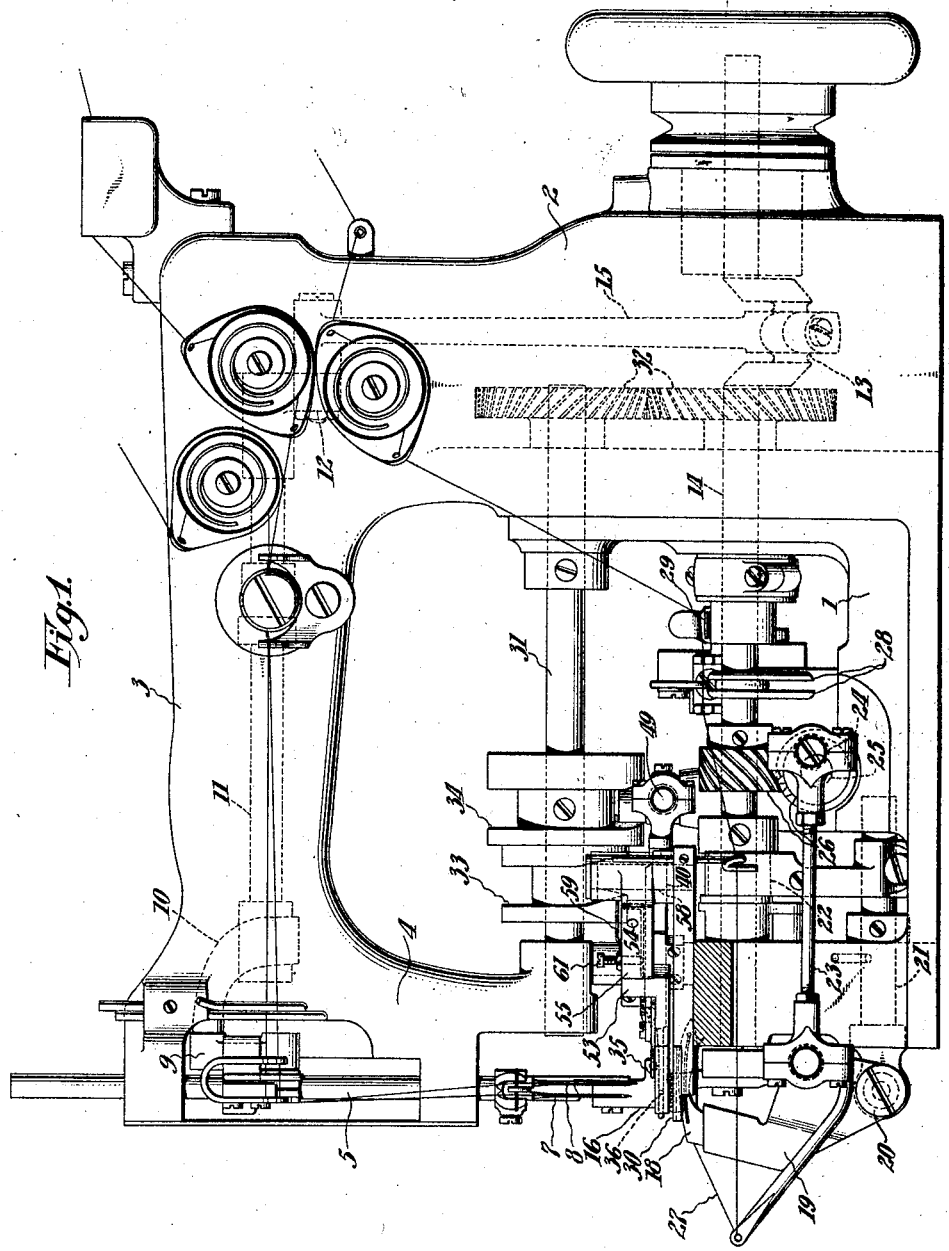
INVENTOR
Rudolph Becker
BY Henry J Miller
ATTORNEY
WITNESSES

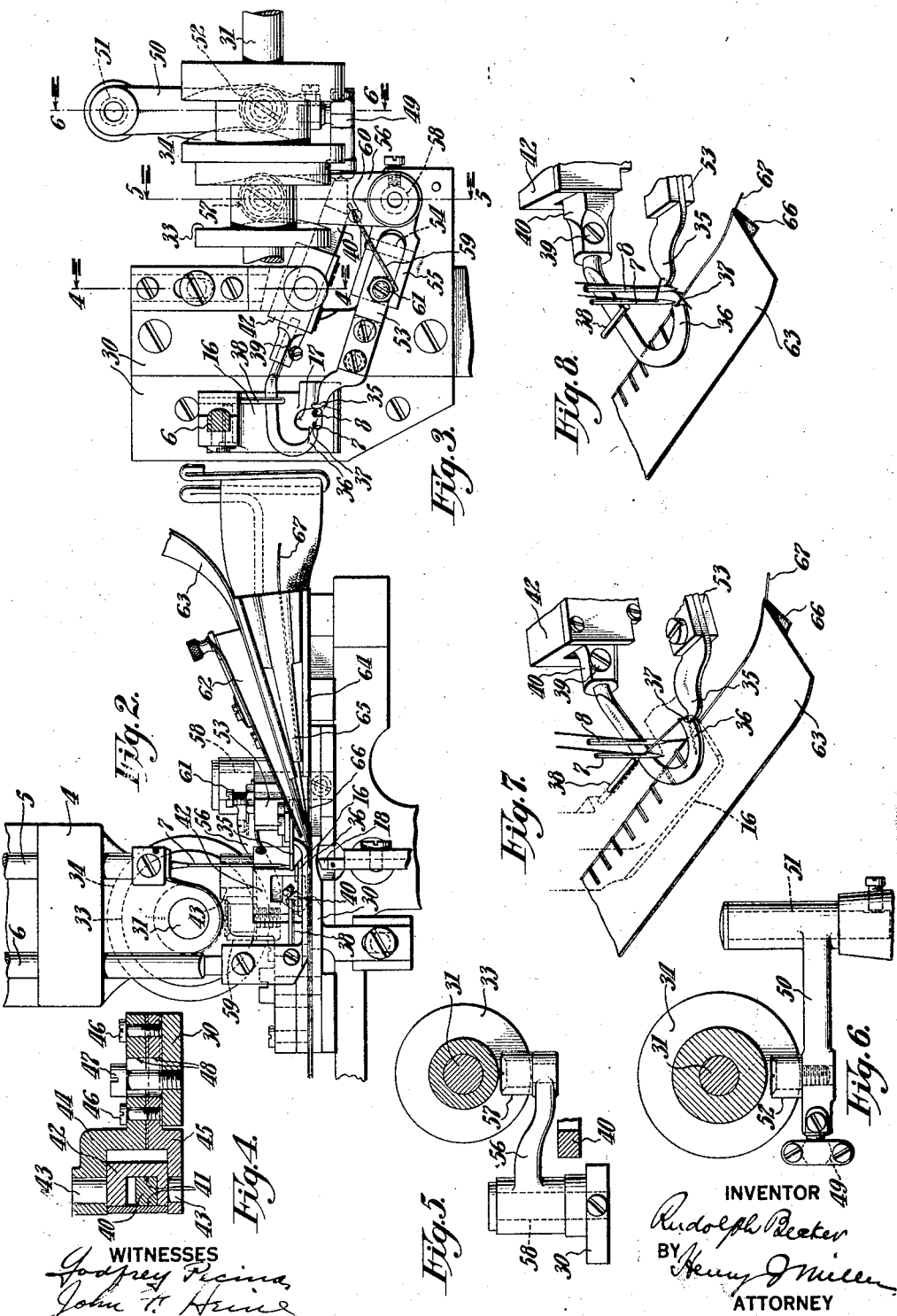

Patented Mar. 29, 1927.  1,622,277

UNITED STATES PATENT OFFICE.

RUDOLPH BECKER, OF NORTH PLAINFIELD, NEW JERSEY, ASSIGNOR TO THE SINGER MANUFACTURING COMPANY, OF ELIZABETH, NEW JERSEY, A CORPORATION OF NEW JERSEY.

SPREADER MECHANISM FOR SEWING MACHINES.

Application filed November 29, 1924. Serial No. 752,876.

This invention relates to sewing machines and more particularly to sewing machines having two upper thread-carrying needles and a lower thread-carrying looper cooperating to form the well known Chauvet & Coulter overedge seam illustrated, for example, in U. S. Patent No. 668,327, of February 19, 1901.

To form a seam of this character it is usual to provide spreader mechanism above the work to carry a loop of one needle-thread across the seam and present it for entry by the other needle.

An object of the invention is to provide a spreader mechanism, the thread-engaging implements of which are moved in substantially straight paths or paths of long radius of curvature, as distinguished from the sharply curved paths of movement of spreaders heretofore mounted on or carried by the presser-bar.

Another object of the invention is to provide a spreader mechanism of the class described, the parts or thread-engaging implements of which do not interfere with the threading of the sewing machine needles.

The invention has for a further object to provide a simplified spreader mechanism which will operate with certainty and which will not interfere with the lifting of the presser-foot of the machine.

To the attainment of the ends in view the spreader implements of the present mechanism are mounted independently of the presser-bar and well to one side of the line of seam-formation; one implement being preferably carried by a bar slidably mounted in a swiveled support so as to move diagonally across the line of seam-formation in nearly a straight line from a position in rear of one needle to a position in advance of the other needle. The other implement is preferably carried by an arm which is mounted on a pivot so arranged that the implement will seize the loop of thread of the one needle carried across the seam by the first implement and move such loop mainly in the direction of feed to a position where it will be entered by the other needle.

The swivelled slide-bar carrying the first mentioned spreader implement is preferably operated by a ball-and-socket connection with a vibrating lever which is actuated by a suitable cam. The pivoted arm carrying the other spreader implement is preferably formed as a part of a lever, the other arm of which is arranged to be actuated from a second cam. Both spreader actuating cams are preferably mounted on a shaft disposed above the level of the sewing machine cloth-plate and parallel to the lower or main-shaft, to which it is connected by suitable one-to-one gearing.

The spreader implement which is carried by the slide-bar is arranged to work close to or rest upon the upper surface of the presser foot and, to permit such implement to move upwardly when the presser-foot is lifted, the slideway for the spreader carrier bar is made of greater height than the vertical thickness of the bar, thus permitting such bar to move vertically relative to its slideway. The other spreader implement is preferably pivoted horizontally upon its pivoted carrier-arm, so that it can swing vertically relative to such arm, when the presser-foot is lifted.

In the accompanying drawings, Fig. 1 is a side elevation of a hat-sweat stitching machine embodying the invention. Fig. 2 is a fragmentary end elevation of the machine showing the spreader mechanism. Fig. 3 is a plan view of the spreader mechanism. Figs. 4, 5 and 6 are, respectively, sectional views on the lines 4—4, 5—5 and 6—6, of Fig. 3. Figs. 7 and 8 are perspective views illustrating the action of the spreader implements on the needle-thread.

The invention is shown as embodied in a two-needle hat-sweat stitching machine having a frame formed with a bed 1, standard 2 and overhanging bracket-arm 3 terminating in the head 4 in which are mounted the usual reciprocating needle-bar 5 and presser-bar 6. The needle-bar carries two eye-pointed needles 7, 8, and is actuated by the usual link connection 9 with the arm 10 on the upper rock-shaft 11 to the rearward end of which is secured an arm 12 connected to the crank 13 on the main-shaft 14 by means of the pitman 15. The usual presser-bar 6 carries the presser-foot 16 having the needle-aperture 17. It is adapted to be lifted and lowered by suitable means common in the art.

Cooperating with the needles 7, 8, is the looper 18 mounted on the looper-carrier 19 which is fulcrumed on the stud-screw 20 carried by the rock-shaft 21, the latter being actuated by the eccentric 22 on the main-shaft. The looper-carrier is connected by a ball-and-socket joint to one end of the link 23 the other end of which is connected to the ball-crank 24 on the cross-shaft 25 which is driven by the main-shaft through the spiral gears 26. The looper may carry an under thread 27 which is controlled by a rotary take-up 28 and thread-nipper 29.

Disposed above the level of the cloth-plate 30 is the cam-shaft 31 which is geared at 32 to the main-shaft 14 to rotate at the same speed as the latter. The shaft 31 has secured thereto the barrel cams 33, 34, which actuate the spreader implements 35, 36.

The implement 36 is shaped like a hook with its shank disposed transversely of the line of seam-formation in rear of the needles and its free end curved forwardly and notched at 37 to engage the thread of the needle 7. The implement 36 lies close to the presser-foot 16 and beneath the horizontal pin 38 carried by the presser-foot. Said implement is secured by a screw 39 in a socket in one end of the bar 40 which works in a slideway 41 formed in the block 42 which is swivelled at 43, 43, to the upper and lower bracket-arms 44, 45, secured together by screws 46 and to the cloth-plate 30 by the screw 47 which, it will be noted, passes through registering slots 48 in the arms 44, 45, to permit adjustment of the block 42 forwardly or rearwardly. The slide-bar 40 is connected by a ball-and-socket joint 49 at its right-hand end, Fig. 3, to the forward end of the lever 50 fulcrumed on the pin 51 rising from the bed 1. The lever 50 carries a cam roll 52 which enters the groove in the barrel-cam 34. There is a vertical working clearance between the bar 40 and the top wall of the slideway 41, Fig. 4. This clearance permits upward movement of the bar 40 and implement 36 when the presser-foot is lifted; the implement 36 being free to follow the movements of the presser-foot and maintain a position substantially in engagement with the upper surface of such foot.

The implement 35 is carried by the arm 53 which is mounted on the horizontal pivot 54 carried by the arm 55 of a bellcrank-lever, the other arm 56 of which carries a cam-follower roll 57 entering the groove in the barrel-cam 33. The bellcrank-lever 55, 56, is fulcrumed on the pin 58 rising from the cloth-plate 30. A spring 59 secured at one end in a socket in the arm 56 by the screw 60, Fig. 3, bears down upon the arm 53 and yieldingly maintains the adjustable stop-screw 61 in engagement with the arm 55. The stop-screw 61 determines the working elevation of the implement 35 and the latter is free to move upwardly about the pivot 54 when the presser-foot is lifted.

The path of the notched end 37 of the implement 36 is nearly a straight line and is inclined forwardly; the notched end 37 moving from a position in rear and at the left of the needle 7 to a position in front and to the right of the needle 8, as shown in Fig. 3. During this movement, which occurs while the needles are out of the work, the implement 36 catches the thread of the needle 7 and carries a loop of such thread across the seam and to a position in front of the needle 8, whereupon such loop is seized by the implement 35 and is moved rearwardly. During this latter movement of the loop its upper limb engages the front side of the needle 8 and its lower limb is carried rearwardly beneath the point of the needle 8 so that the latter descends between the limbs of the thread-loop. In the meantime the implement 36 is retracted so as not to be struck by the descending needles.

The carriers of the implements 35, 36, both extend to the same side of the line of seam-formation and do not interfere in any way with the threading of the needles 7, 8. The operative extremities of the implements 35, 36, are moved in nearly straight paths or paths of long radius of curvature. The thread-loop engaged thereby is thus carried as directly as possible to its destination in a minimum time portion of a stitch-forming cycle.

The machine may be equipped with the usual guide 62 for a hat-sweat 63, and with a suitable folder 64 and wire guide 65 for the folded strip 66 and enclosed wire 67. These parts, however, form no part of the present invention which, it will be understood, is not limited in its application to hat-sweat stitching machines but is useful in any multiple-needle machine for presenting loops of one needle-thread above the work to an adjacent needle.

Having thus set forth the nature of the invention, what I claim herein is:—

1. The combination with a sewing machine having a plurality of eye-pointed needles, a loop-taker, and a vertically movable presser-foot and presser-bar, of spreader implements mounted and sustained independently of the presserfoot and presser-bar on the needle side of the work entirely at one side of the line of seam-formation and disposed with their working extremities above and closely adjacent the presser-foot, said implements being free to move vertically when the presser-foot is lifted.

2. The combination with a sewing machine having a plurality of needles arranged abreast of the direction of feed, and a vertically movable presser-foot and presser-bar of a spreader mechanism including horizontally disposed carrier-bars movably mounted entirely at one side of the line of seam-formation, and spreader implements carried by said bars and extending to the field of action of said needles, one of said implements being in the form of a curved bar, the shank of which is disposed at all times in rear of the needles across the line of seam-formation and the free end of which is curved forwardly and toward the needles and notched to engage the needle-thread.

3. In a spreader mechanism for sewing machines, a horizontally disposed carrier-bar mounted to reciprocate longitudinally and swivel about a vertical axis disposed intermediate its ends, a spreader implement carried by said bar, an actuating cam, and a pivoted cam-follower lever connected to actuate said bar, said bar being also free to move vertically.

4. In a spreader mechanism for sewing machines, a horizontally disposed carrier-lever mounted to swing about a vertical axis, and a spreader implement hinged on said carrier-lever to swing vertically relatively to the latter.

5. The combination with a presser-foot and stitch-forming mechanism including a plurality of needles, of a spreader implement movable across the line of seam-formation above the presser-foot to carry a loop of thread from one needle toward an adjacent needle, a second spreader implement disposed to work at a level above said first-mentioned spreader implement and adapted to seize the loop from the first-mentioned spreader implement and present it to the adjacent needle, and means for adjusting the working elevation of said second-mentioned spreader implement.

In testimony whereof, I have signed my name to this specification.

RUDOLPH BECKER.